(12) United States Patent
Lebow

(10) Patent No.: US 6,243,862 B1
(45) Date of Patent: Jun. 5, 2001

(54) METHODS AND APPARATUS FOR TESTING COMPONENTS OF A DISTRIBUTED TRANSACTION PROCESSING SYSTEM

(75) Inventor: Max A. Lebow, Philadelphia, PA (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/012,653

(22) Filed: Jan. 23, 1998

(51) Int. Cl.[7] .................................................. G06F 9/45
(52) U.S. Cl. ........................ 717/4; 717/8; 717/9; 702/119
(58) Field of Search ................................ 717/4, 7, 8, 9; 707/10; 702/119, 203; 714/799

(56) References Cited

U.S. PATENT DOCUMENTS

| | | | |
|---|---|---|---|
| 4,617,663 | * | 10/1986 | Lake et al. ............................ 714/736 |
| 5,359,546 | * | 10/1994 | Hayes et al. ......................... 702/123 |
| 5,481,711 | * | 1/1996 | Sotani ..................................... 717/3 |
| 5,572,650 | * | 11/1996 | Antis et al. ........................... 345/356 |
| 5,586,312 | * | 12/1996 | Johnson et al. ....................... 707/10 |
| 5,600,579 | * | 2/1997 | Steinmetz, Jr. ....................... 703/13 |
| 5,664,173 | * | 9/1997 | Fast ....................................... 707/4 |
| 5,680,610 | * | 10/1997 | Smith et al. .......................... 707/10 |
| 5,819,066 | * | 10/1998 | Bromberg et al. ................... 707/102 |
| 5,819,091 | * | 10/1998 | Arendt et al. ....................... 709/331 |
| 5,852,732 | * | 12/1998 | Freund et al. ....................... 709/101 |
| 5,918,232 | * | 6/1999 | Pouschine et al. ................... 707/103 |
| 5,933,601 | * | 8/1999 | Fanshier et al. ..................... 709/223 |
| 6,014,666 | * | 1/2000 | Helland et al. ......................... 707/9 |
| 6,035,501 | * | 3/2000 | Siegel et al. ........................ 707/102 |
| 6,141,679 | * | 8/1999 | Schaefer et al. ..................... 709/201 |

OTHER PUBLICATIONS

Ostrand et al, "The category partition method for specifying and genertinig funcational tests", Comm. of the ACM, vo. 31, No. 6, pp. 679–686, Jun. 1988.*

Balcer et al, "Automatic genertion of test scripts from formal test specifications", ACM pp. 210–218, Jun. 1989.*

Clement, "A distributed architecture for programming environments", ACM pp. 11–21, 1990.*

* cited by examiner

Primary Examiner—Kakali Chaki
Assistant Examiner—Anil Khatri
(74) Attorney, Agent, or Firm—Mark T. Starr; Woodcock Washburn Kurtz Mackiewicz & Norris; Lise A. Rode

(57) ABSTRACT

A computer executable test language is provided for testing a component of a distributed transaction processing system implemented in accordance with the X/Open Distributed Transaction Processing model and supporting the XATMI application programming interface of said model (XATMI API). The test language comprises a plurality of commands, each command corresponding to a respective one of the function calls of the XATMI API. At least some of the commands of the test language have a syntax and semantics that requires a lesser number of parameters to be supplied with the command than the formal syntax of the corresponding function call of the XATMI API, thus hiding the complexities of the XATMI API from the test operator. A client program of the test environment comprises an interpreter of the test language that determines from a parsed test command whether any parameters required by the formal syntax of the XATMI API have not been supplied, generates default values for any unsupplied parameters, constructs the corresponding function call of the XATMI API in accordance with its formal syntax using the generated defaults, and issues the constructed function call to the component under test. A server program of the test environment comprises at least one service that provides an expected response to a function call issued by the client program.

32 Claims, 6 Drawing Sheets

\*\*\* SAMPLE.txt  
\*\*\* This ia a sample test script  } — 70 test SAMPLEpreamble — 72 setlog 31 — 74 bp1 = alloc( X_COMMON, ch_comm)  
bp2 = alloc( X_C_TYPE, mx_c)  
bp3 = alloc( X_C_TYPE, mx_c_full) } — 76 test SAMPLEcommon call (callService1,bp1) } — 78 test SAMPLEctype call (callService1,bp2)  
call (callService1,bp3) } — 80

\*\*\*  
\*\*\* End of script SAMPLE.txt  
\*\*\*

*Figure 3*

```
=================================vvvvvvvvvvvvvvvvv
mc: V5.700 BEGIN TEST BED FILE SAMPLE.txt:  <date/time>
=================================^^^^^^^^^^^^^^^^^             }— 82
*** SAMPLE.txt
*** This is a sample test script test SAMPLEpreamble setlog 31                                                        }— 84
<date/time> (TML) mc: LOG LEVEL IS NOW 31 bp1 = alloc ( X_COMMON, ch_comm)
<date/time> (TP) mc: tpalloc bp1 = (type=X_COMMON, subtype=ch_comm mc-size=0)
<date/time> (TP) mc: tpalloc returns bp1 (type=X_COMMON subtype=ch_comm address=0x8b1488)

bp2 = alloc (X_C_TYPE, mx_c)
<date/time> (TP) mc: tpalloc bp2 = (type=X_C_TYPE, subatype=mx_c mc-size=0)     }— 86
<date/time> (TP) mc: tpalloc returns bp2 (type=X_C_TYPE subtype=mx_c address=0x8b14f8)

bp3 = alloc (X_C_TYPE, mx_c_full)
<date/time> (TP) mc: tpalloc bp3 = (type=X_C_TYPE, subtype=mx_c_full mc-size=0)
<date/time> (TP) mc: tpalloc returns bp3 (type=X_C_TYPE subtype=mx_c_full address=0x8b1568)

test SAMPLEcommon
<date/time> (TML) ENDING TEST: SAMPLEpreamble     }— 88
<date/time> (TML) STARTING TEST: SAMPLEcommon call(callService1,bp1)
<date/time> (TML) mc: tpcall bp1::type=X_COMMON subtype=ch_comm size=0 address=0x8b1488
<date/time> (INT) buf-load.c: type=X_COMMON subtype=ch_comm bufSize=80                       }— 90
<date/time> (TP) mc: tpcall to callSvc1: ( ilen=0 flags=TPNOFLAGS )
<date/time> (TP) mc: tpcall to callSvc1 returns RETURNOK = 0 olen=80 tperrno=TPOK
```

*Figure 4A*

```
test SAMPLEctype
<date/time> (TML) ENDING TEST: SAMPLEcommon
<date/time> (TML) STARTING TEST: SAMPLEctype call (callService1,bp2)
<date/time> (TML) mc: tpcall bp2::type=X_C_TYPE subtype=mx_c size=0 address=0x8b14f8
<date/time> (INT) buf-load.c: type=X_C_TYPE subtype=mx_c bufSize=80
<date/time> (TP) mc: tpcall to callSvc1: ( ilen=0 flags=TPNOFLAGS )
<date/time> (TP) mc: tpcall to callSvc1 returns RETURNOK = 0 olen=80 tperrno=TPOK      ⎤ 92 call(call Service1,bp3)
<date/time> (TML) mc: tpcall bp3::type=X_C_TYPE subtype=mx_c_full size=0 address=0x8b1568
<date/time> (INT) buf-load.c: type=X_C_TYPE subtype=mx_c_full bufSize=80
<date/time> (TP) mc: tpcall to callSvc1: ( ilen=0 flags=TPNOFLAGS )
<date/time> (TP) mc: tpcall to callSvc1 returns RETURNOK = 0 olen=80 tperrno=TPOK       ⎤ 94

***
***  End of script SAMPLE.txt
***
================================
mc: completed
================================
Date and time completed:  <date/time>
                 lines  = 29
                 tests  = 3
                  call  = 3
            RETURNBADs  = 0
             TX begins  = 0
            TX commits  = 0
          TX rollbacks  = 0                                                              ⎤ 96
              interval  = 00:00:04
  TRANSACTIONS/SECOND  = 0
        CALLS/SECOND  = 0
================================
```

*Figure 4B* form of begin-transaction function to indicate processing of a transaction has begun. This operation is typically logged to an audit file to demarcate the operations associated with the particular transaction. Following the begin-transaction function, the other functions associated with the application-defined transaction are performed and are also logged to an audit file. If all operations associated with a transaction complete successfully, a commit function is invoked to make permanent any state changes that have occurred as a result of the# METHODS AND APPARATUS FOR TESTING COMPONENTS OF A DISTRIBUTED TRANSACTION PROCESSING SYSTEM

BACKGROUND

1. Field of the Invention

The present invention is directed to distributed transaction processing systems. More particularly, the present invention is directed to methods and apparatus for testing components of a distributed transaction processing system that implements the X/Open Distributed Transaction Processing model.

2. Description of the Prior Art

On-line transaction processing (OLTP) is a technology that has been used successfully for business-critical applications by large enterprises for many years. With OLTP, users at terminals send messages to application programs, and these in turn update databases in real time. This is in contrast to batch or queued processing of transactions where the transactions are processed at a later time.

An example of an OLTP application is an airline reservation system. When a travel agent sends a request to reserve a seat on a plane, a database is updated accordingly, and a confirmation message is sent back to the agent'terminal. All of the tasks are part of a single transaction, and many agents can perform transactions at the same time. OLTP systems are typically used in environments that support large numbers of users, all accessing the same database, with hundreds and sometimes thousands of transactions taking place each second. The systems are typically based on large enterprise servers that can provide the performance, reliability, and data integrity demanded by these environments.

A transaction may be thought of as a set of actions performed by a transaction processing system wherein the actions together exhibit the properties of Atomicity, Consistency, Isolation, and Durability (ACID). The following definitions are given in *Transaction Processing: Concepts and Techniques,* by Jim Gray and Andreas Reuter, Morgan Kaufmann Publishers, Inc., 1993, p. 6:

Atomicity. A transaction'changes to the state are atomic; either all happen or none happen. These changes include database changes, messages, and actions on transducers.

Consistency. A transaction is a correct transformation of the state. The actions taken as a group do not violate any of the integrity constraints associated with the state. This requires that the transaction be a correct program.

Isolation. Even though transactions execute concurrently, it appears to each transaction, T, that other transactions execute either before T or after T, but not both.

Durability. Once a transaction completes successfully, (commits), the state of the data is changed to reflect the successful completion of the transaction, and the state of the data will survive system failures.

To maintain the properties identified above, at the beginning of processing a transaction, a transaction processing application program typically invokes some form of begin-transaction function to indicate processing of a transaction has begun. This operation is typically logged to an audit file to demarcate the operations associated with the particular transaction. Following the begin-transaction function, the other functions associated with the application-defined transaction are performed and are also logged to an audit file. If all operations associated with a transaction complete successfully, a commit function is invoked to make permanent any state changes that have occurred as a result of the transaction. The commit operation is logged to the audit file to indicate that all operations have completed successfully. If an error occurs during processing of the transaction and a commit operation is not performed, a rollback function is invoked to undo the effects of the operations performed to that point in processing the transaction.

Distributed Transaction Processing (DTP) is a form of on-line transaction processing that allows a single transaction to be performed by multiple application programs that access one or more databases on one or more computers across a network. This type of transaction, in which multiple application programs cooperate, is called a distributed transaction. Using DTP, for example, related databases at regional and branch locations can be synchronized. DTP also facilitates transaction processing across multiple enterprises. For example, DTP can be used to coordinate the computers of manufactures and suppliers, or to coordinate the computers of enterprises in related industries, such as the travel agency, airline, car rental, and hotel industries.

Transaction processing in a distributed environment can be either non-global or global. In a non-global transaction, the same work takes place as in a traditional transaction, but the work is distributed in a client/server manner. For example, a travel agent may request an airline reservation via a client application program that has a graphical user interface. The client application program communicates with a server application program that manages the reservation database. The server application program updates the database, commits or aborts its own work, and returns information to the client application program, which notifies the travel agent.

A global transaction consists of multiple, coordinated database updates, possibly occurring on different computers. Global transactions are used when it is important that all databases are synchronized so that either all updates are made or none are made. Continuing with the previous example, the travel agent may also need to reserve a rental car and hotel room. The customer who is traveling wants to make sure that all reservations are coordinated; if a flight is unavailable, the hotel and car reservations are not needed. For the purpose of illustrating a global transaction, the airline, car, and hotel databases are on different transaction processing systems.

The global transaction begins when the travel agent requests the reservation from a workstation client application program with a graphical user interface. The client program contacts three server application programs on different transaction processing systems. One server program books a flight, another reserves a car, and the third makes a hotel reservation. Each of the server application programs updates its respective database. The transactions processed by each of the server application programs may be referred to as subordinate transactions of the global transaction. A global transaction manager coordinates the updates to the three databases, and a subordinate transaction manager on each of the individual transaction processing systems coordinates locally with the server application programs. The server application programs return information to the client application program.

A major advantage of global transaction processing is that tasks that were once processed individually are processed as a group, the group of tasks being the global transaction. The database updates are made on an all-or-nothing basis. For example, if an airline seat is not available, the hotel and car reservations are not made. Thus, with a global transaction, tasks that were once performed independently may be coordinated and automated.

As with non-global transactions, global transactions must possess the ACID properties. In order to preserve the ACID properties for a global transaction, the commit processing is modified to a two-phase commit procedure. Under a two-phase commit, a global transaction manager first requests that each of the subordinate transaction managers prepare to commit their updates to the respective databases. If all the local transaction managers respond that they are prepared to commit, the global transaction manager sends a commit request to the local transaction managers. Thus, the two parts of the two-phase commit process are (i) prepare to commit the database updates, and (ii) commit the database updates. If any one of the transaction managers is unable to commit, the entire global transaction is aborted and each transaction manager performs a rollback function to undo the processing that may have occurred up to that point. In short, the two-phase commit process ensures that multiple databases participating in a single global transaction are synchronized—either all database updates requested by the global transaction are made or, in the event of system or component failure, none are made. Two-phase commit guarantees global data integrity and preserves the ACID properties in a DTP environment.

An industry consortium of users and vendors, known as X/Open™, has developed a model architecture for DTP, referred to as the X/Open Distributed Transaction Processing model. The X/Open DTP model is a software architecture that allows multiple application programs to share resources provided by multiple resource managers, and allows their work to be coordinated into global transactions. The X/Open DTP model comprises a number of components, application programming interfaces, and communications interfaces.

FIG. 1 illustrates a client system 10 and a server system 12 both constructed in accordance with the X/Open DTP model architecture. Referring to the client system 10 as an illustrative example, the components of the X/Open DTP model include an application program (AP) 14, one or more resource managers (RMs) 16, a Transaction Manager (TM) 18, and a Communications Resource Manager (CRM) 20.

An Application Program (AP), such as client application program 14, is a user-defined software component that defines global transaction boundaries and specifies actions that constitute global transactions. It also provides access to one or more resources that are required by a transaction, In a global transaction, two or more APs perform their individual functions which, when combined, make up the global transaction. One of the APs will be the superior AP, that is, the AP that starts and finishes the global transaction. The other APs will be subordinate. A hierarchy of APs may be established where a subordinate AP is superior to another AP. In the example of FIG. 1, the client application program 14 might be the superior AP, and the server application program 40 the subordinate AP.

A Resource Manager (RM) 16 provides access to a resource for the AP 14. The X/Open DTP model permits multiple resource managers. Database management systems and file access systems are examples of system software components that act as RMs.

The APs begin and end transactions under the control of the Transaction Manager (TM) 18. The TM 18 is a system software component that assigns transaction identifiers to global transactions, monitors their progress, coordinates their completion, and coordinates failure recovery. The TM enforces the transaction property of atomicity. If a global transaction is being processed, the TM adheres to the two-phase commit transaction processing protocol.

The CRM 20 controls communication between the AP 14 and other APs (e.g., AP 40) that are participating in global transactions, as well as between the TM 18 and TMs on separate data processing systems (e.g., the TM of system 12).

The X/Open DTP model provides a number of standard application programming interfaces that enable application programs to interact with system components to conduct global transactions. These application programming interfaces include one or more AP-RM interfaces 22, an AP-TM interface 24, an AP-CRM interface 26, one or more RM-TM interfaces 28, and a TM-CRM interface 30.

The AP-RM interfaces 22 provide the AP 14 with access to resources (such as databases) through their respective RMs 16. These interfaces are not specifically defined by the X/Open DTP model, as a number of different resources can exist on a system. Examples of AP-RM interfaces include the Structured Query Language (SQL) and the Indexed Sequential Access Method (ISAM).

The AP-TM interface 24 is provided by the TM 18 to define global transaction boundaries. The AP-TM interface is also referenced as the TX interface. Further information on the TX interface is available in Distributed Transaction Processing: The TX (Transaction Demarcation) Specification, X/Open Company Limited, U.K., (1992). The TX interface is described in somewhat greater detail below.

The AP-CRM 26 interfaces are provided by the CRM 20 to the AP 14. The X/Open DTP model supports the following three AP-CRM interfaces: the TxRPC interface, the XATMI interface, and the CPI-C interface. Each of these interfaces can be used to enable communication between APs that utilize the same interface. The present invention relates in particular to systems that implement the XATMI interface. Although the XATMI interface is discussed below in somewhat greater detail, further information on the XATMI interface is available in Distributed Transaction Processing: The XATMI Specification, X/Open Company Limited, U.K., (1993), which is hereby incorporated by reference in its entirety.

The TM-RM interfaces 28 are similar to the AP-RM interfaces 22 and are used for purposes of transaction control (preparing, committing, or rolling-back). The TM-RM interfaces 28 and TM-CRM interface 29 are described further in XA Interface, Distributed Transaction Processing: The TX (Transaction Demarcation) Specification, X/Open Company Limited, U.K., (1992).

In addition to the foregoing application programming interfaces, systems that implement the X/Open DTP model can communicate with each other using the Open Systems Interconnection (OSI) Transaction Processing (TP) communications protocol 34 (ISO/IEC 10026). OSI TP is a machine independent protocol that supports communications between computers in a transaction processing system. XAP-TP 32 is a standard interface that provides access to OSI TP services. It serves as the interface between a CRM 20 and the OSI TP protocol 34 to initiate and support communications between local and remote application programs within a DTP system. The XAP-TP interface 32 is described in detail in the X/Open specification entitled ACSE/Presentation: Transaction Processing API (XAP-TP).

Lower layer communication protocols 36 handle the low-level communication chores needed to send information between systems 10 and 12 via a network 38. These lower layer protocols 36 can, for example, be OSI or TCP/IP. The X/Open DTP model does not define an interface to these lower layers.

As the present invention relates particularly to X/Open DTP model-based transaction processing systems in which the CRM component implements the XATMI AP-CRM interface, further details of the XATMI interface follow.

The XATMI interface relies principally on the following API requests supported by the TX interface:

tx_begin( )—a demarcation function that indicates that subsequent work performed by the calling AP is in support of a global transaction;

tx_commit( )—a demarcation function that commits all work done on behalf of the current global transaction; and tx_rollback( )—a demarcation function that rolls back all work done on behalf of the current global transaction.

Further details of the TX interface can be found in Distributed Transaction Processing: The TX (Transaction Demarcation) Specification, X/Open Company Limited, U.K., (1992).

The XATNU API provides a set of function calls, collectively referred to as the tp*( ) function calls, that can be called to perform various functions. The following is a list of these functions, callable from any C language application program:

| Name | Description |
|---|---|
| | Typed Buffer Functions |
| tpalloc( ) | Allocate a typed buffer. |
| tpfree( ) | Free a typed buffer. |
| tprealloc( ) | Change the size of a typed buffer. |
| tptypes( ) | Determine information about a typed buffer. |
| | Functions for Writing Service Routines |
| tpservice( ) | Template for service routines. |
| tpreturn( ) | Return from a service routine. |
| | Functions for Dynamically Advertising Service Names |
| tpadvertise( ) | Advertise a service name. |
| tpunadvertse( ) | Unadvertise a service name. |
| | Functions for Request/Response Services |
| tpacall( ) | Send a service request. |
| tpcall( ) | Send a service request and synchronously await its reply. |
| tpcancel( ) | Cancel a call descriptor for an outstanding reply. |
| tpgetrply( ) | Get a reply from a previous service request. |
| | Functions for Conversational Services |
| tpconnect( ) | Establish a conversational service connection. |
| tpdiscon( ) | Terminate a conversational service connection abortively. |
| tprecv( ) | Receive a message in a conversational connection. |
| tpsend( ) | Send a message in a conversational connection. |

Each of the foregoing XATMI API requests has a formal syntax that specifies the format and arguments of each request. The formal syntax for each request is specified in Distributed Transaction Processing: The XATMI Specification, X/Open Company Limited, U.K., (1993).

The XATMI interface supports typed buffers through the typed buffer functions listed above. A typed buffer contains data and has associated with it a type and possibly a subtype, that indicate the meaning or interpretation of the data. An AP calls tpalloc( ) to allocate a typed buffer of a specified type and subtype, can call tprealloc( ) to increase its size, and must eventually call tpfree( ) to dispose of it. A receiver of a typed buffer can call tptypes( ) to determine the type and subtype of a buffer as well as its size.

Generally, there are two types of services supported by the XATMI interface—request/response services and conversational services. In the request/response service paradigm, requests can be issued to services in two ways: synchronously or asynchronously. The tpcall( ) function sends a request to a specified service, and returns any response in an application-defined typed buffer. The call to tpcall( ) returns after any expected response arrives. The tpacall( ) function also sends a request to a specified service, but it returns without waiting for the service'response, thereby letting the requester do additional work while the service routine processes its request. The tpgetrply( ) function waits to receive a service reply corresponding to a specified request, and returns the response in an application defined typed buffer. A requester not wanting to receive a reply to a particular request can use the tpcancel( ) function, which informs the CRM that any response should be silently discarded.

In the conversational service paradigm, a requester invokes a service routine and converses with it in an application-defined manner. Conversational communication with a service is initiated by calling the tpconnect( ) function. The service name and application data can be passed to the service as parameters of the call. A descriptor is returned that the requester subsequently uses to refer to the newly established connection. tpsend( ) and tprecv( ) are used by APs to exchange data over an open connection. Normally, a connection is terminated by the CRM after the service returns by calling tpreturn( ). If, however, a requester wishes to terminate a connection prematurely, the tpdiscon( ) function is used.

The functions tpservice( ) and tpreturn( ) are used to facilitate the writing of service routines in server application programs. A service routine is invoked from implementation specific dispatching code contained within a server. Handling of the communication path is independent of the service and is the responsibility of the CRM. tpservice( ) is the template for writing service routines, and can be used both for request/response services, as well as for conversational services. tpreturn( ) is used to send a service'reply message. If an AP is waiting for a reply as a result of either a tpcall( ), tpgetrply( ), or tprecv( ), then a successful call to tpreturn( ) by the service will place the reply in the receiving AP'buffer.

When a requesting AP uses either tpacall( ), tpcall( ), or tpconnect( ) to interact with a particular service, it passes a service name identifier to the service AP as a parameter to the call. When servers are started, they advertise the set of services that they offer by name, in an application-specific manner. tpadvertise( ) is used by a server to advertise a new service that it offers. The function has two parameters: the service name identifier and the actual C language routine that the server must invoke whenever a requesting AP requests that service by name. A server can use the tpunadvertise( ) function to unadvertise a service.

With systems that adhere to the X/Open DTP model, application programmers can develop custom client and server application programs (APs) to implement customized transaction processing applications, such as reservation systems, banking systems, and the like. In systems that have a CRM component that implements the XATMI interface, application programs (APs) make calls to the TM and CRM components of the system, via the respective TX and XATIMI interfaces, to initiate and execute global transactions. In general, a global transaction is processed as follows. An input message arrives at a client application program executing on one system. The client application program uses a tx_begin( ) primitive of the TX interface to start a global transaction. Thereafter, the client application program uses various XATMI primitives, such as tpcall( ), tpacall( ), and toalloc( ), to call various services provided by one or more server application programs executing on the same or other systems. The server application programs may use local RMs to update databases in response to the calls made by the client application program. When the work is done, the client application program will use the tx_commit( ) primitive of the TX interface to initiate the two-phase commit process and to coordinate that process among the client's TM and the TMs of the various service application programs involved in the transaction. Specifically, the initiating TM (the one that received the tx—begin( )) will communicate with all the other TMs to request approval to commit and update the databases. If all agree, the database will be updated. If any do not agree, then a rollback function is performed to return all databases to the state they were in before the transaction began. If the client application program and/or any of the server application programs reside on different computer systems, the two systems will communicate with each other using their respective CRMs, which are built on a foundation of OSI TP. As mentioned above, OSI TP provides services and protocols that assist the two-phase commit process and communication between systems. The OSI TP implementations on each system in turn operate across lower layer services and protocols that can, for example, be OSI or TCP/IP.

Typically, system vendors supply software suites for a given hardware platform that implement the RM, TM, and CRM components of the X/Open DTP model, along with tools that enable application programmers to develop DTP application programs (APs) that work in conjunction with the model. These vendors may also supply an implementation of the OSI TP standard to allow the RM, TM, and CRM components to interoperate with other systems that comply with the X/Open DTP model. For example, Unisys Corporation provides a suite of software products for its OS 2200 systems, called "Open/OLTP," that are based on the X/Open DTP model and OSI TP protocols. The Unisys Open/OLTP suite for OS 2200 systems includes an integrated TM and CRM. The CRM component supports the XATMI AP-CRM interface. The integrated product allows user-written client and server programs to use the TX and XATMI interfaces to the TM and CRM components to conduct global and non-global transactions. In addition, the Unisys Open/OLTP suite for OS 2200 systems includes an OSI-TP product that implements the OSI TP communications protocol, enabling user-written application programs (APs) to communicate with other APs on different systems. The integrated TM/CRM product relies on the OSI-TP product to establish and terminate dialogues with TMs on remote computers, to send and receive messages, and to coordinate commitment and rollback processing with the other systems.

While the X/Open DTP model and the set of specifications associated with the model describe the required functionality and API's that must be supported, the actual coding of TM, CRM, and OSI TP software components is left to the software developer. The program code developed to implement these components may vary widely from vendor to vendor, due to factors such as the programming language employed, and the underlying hardware platform on which the software is designed to operate. Consequently, any vendor of software that implements these components of the X/Open DTP model must be able to test the software to ensure its compliance with the associated specifications. One way to test these components is to exercise the TX and XATMI functions in an actual system environment to ensure that the system handles and executes the various functions correctly. However, developing sample application programs to perform a comprehensive test using the TX and XATMI interfaces is time consuming and requires that the tester be well-versed in the formal syntax of the various functions that each interface provides. In the case of the XATMI interface in particular, each of the functions provided that interface has a detailed formal syntax that requires calls to the various functions to be accompanied by various parameters. Building a test program containing sample calls to the various API functions using their formal syntax would be extremely time consuming and difficult for all but the most skilled programmers having an intimate knowledge of the XATMI API. Consequently, there is a need for a more efficient, and less complicated way to test the functionality of TM, CRM, and OSI TP components that support the XATMI API of the X/Open DTP model—one that does not require that the tester have an expert knowledge of the formal syntax of the XATMI API. The present invention satisfies this need.

SUMMARY OF THE INVENTION

The present invention is directed to methods and apparatus for testing a component of a distributed transaction processing system implemented in accordance with the X/Open Distributed Transaction Processing model and supporting the XATM application programming interface of the model (XATMI API). According to the present invention, a test language is provided from which test scripts can be written by a test operator. The test language of the present invention comprises a plurality of commands, each command corresponding to a respective one of the function calls of the XATMI API. At least some of the commands of the test language have a syntax and semantics that requires a lesser number of parameters to be supplied with the command than the formal syntax of the corresponding function call of the XATMI API. In this manner, much of the complexities of the XATMI API can be hidden from the test operator. The test operator can generate complex test scripts that thoroughly exercise the component(s) under test, without needing a detailed understanding of the complexities of the XATMI API.

A tool that embodies the methods and apparatus of the present invention comprises a client program and one or more server programs. The client program comprises an interpreter of the test language that determines from a parsed test command of a test script whether any parameters required by the formal syntax of the XATMI API have not been supplied with that test command, generates default values for any unsupplied parameters, constructs the corresponding function call of the XATMI API in accordance with its formal syntax using the generated default values, and then issues the constructed function call to the component under test. The interpreter may further allocate any buffers needed to execute the function call. A server program of the test environment comprises at least one service that provides an expected response to a function call issued by the client program. Information concerning the execution of each issued function call by the component under test is written to a log file. With this tool, the test operator can concentrate on developing test scripts that thoroughly exercise the functionality of a component under test, leaving the details of the formal syntax of the XATMI API to the interpreter. Testing is therefore simplified, and as a result, more efficient.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 3 shows a sample test script that employs the test language of the present invention;

FIGS. 4a and 4b show a sample log file generated in accordance with the logging features of the present invention.

DETAILED DESCRIPTION OF THE PREFERRED EMBODIMENT

The present invention is directed to methods and apparatus for testing a component of a distributed transaction processing system implemented in accordance with the X/Open Distributed Transaction Processing model and supporting the XATMI application programming interface of the model (XATM API). The methods and apparatus of the present may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 2:
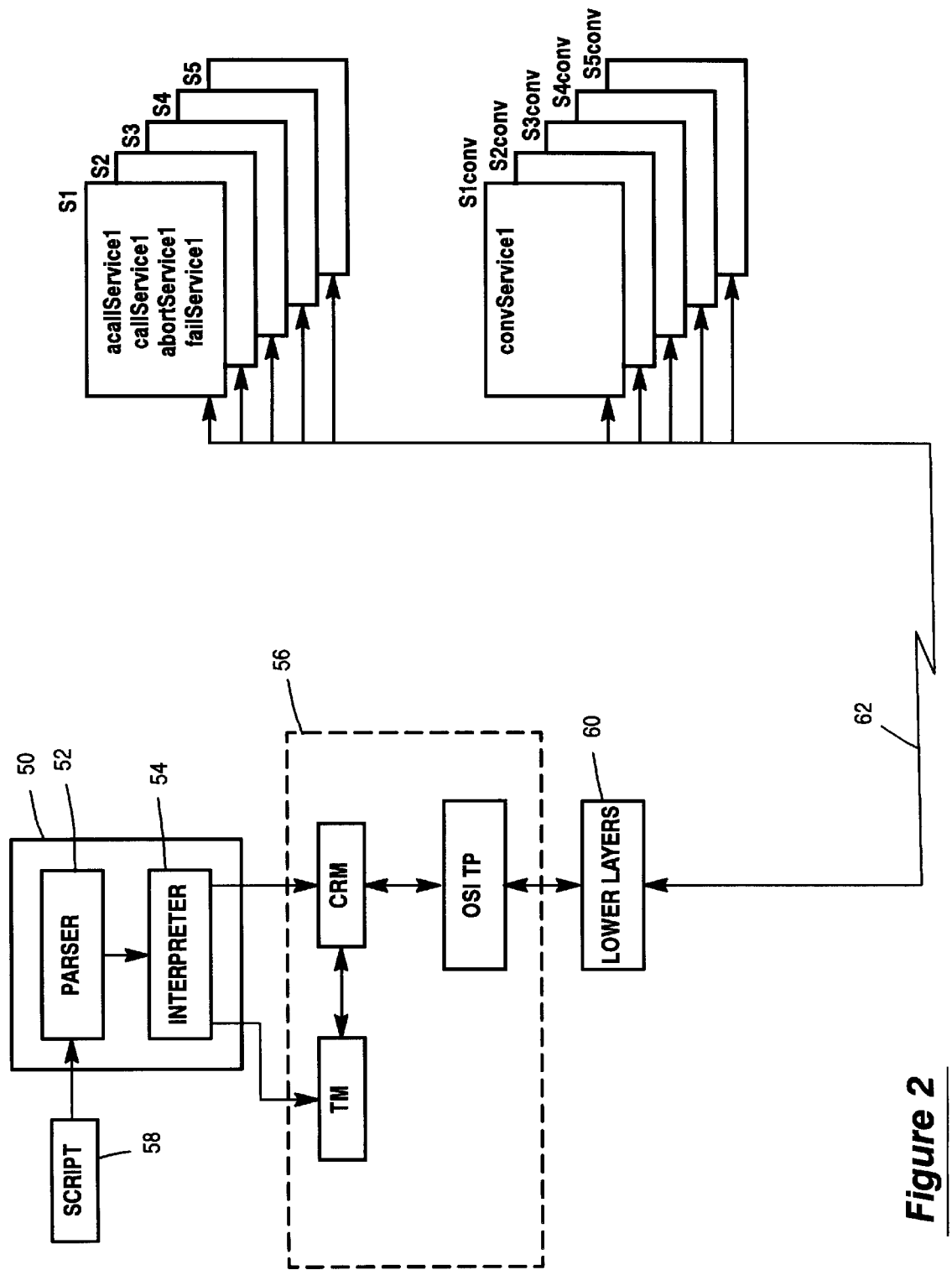
FIG. 2 is a block diagram showing apparatus for testing a component of a distributed transaction processing system in accordance with the present invention.

Referring to the drawings, wherein like numerals represent like elements throughout, FIG. 2 is a block diagram of a tool for testing a component of a distributed transaction processing system in accordance with the methods and apparatus of the present invention. More specifically, in the present embodiment, the tool is designed for testing components of a distributed transaction processing system that are implemented in accordance with the X/Open Distributed Transaction Processing (DTP) model and that support the XATMI application programming interface of the X/Open DTP model (XATMI API). As shown, the tool comprises a client program 50 and one or more server programs, e.g., s1, s2, . . . s5 and s1conv, s2conv, . . . s5conv. In the present embodiment, there are two types of server programs. The first type of server program provides services that respond to XATMI finction calls of the request/response type, and the second type of server program responds to XATMI function calls of the conversational type. According to the present embodiment, the client program and each of the different types of server programs can be multiply instantiated on one or more respective computers.

Multiple instances of the client program can each be scripted to call the same server or a different server, depending upon testing requirements. For example, to test server system limits, multiple instances of the client program can be run, even on several different computers, and all of the instances of the client program can direct function calls to the same server to test the limits of that server.

Figure 1:
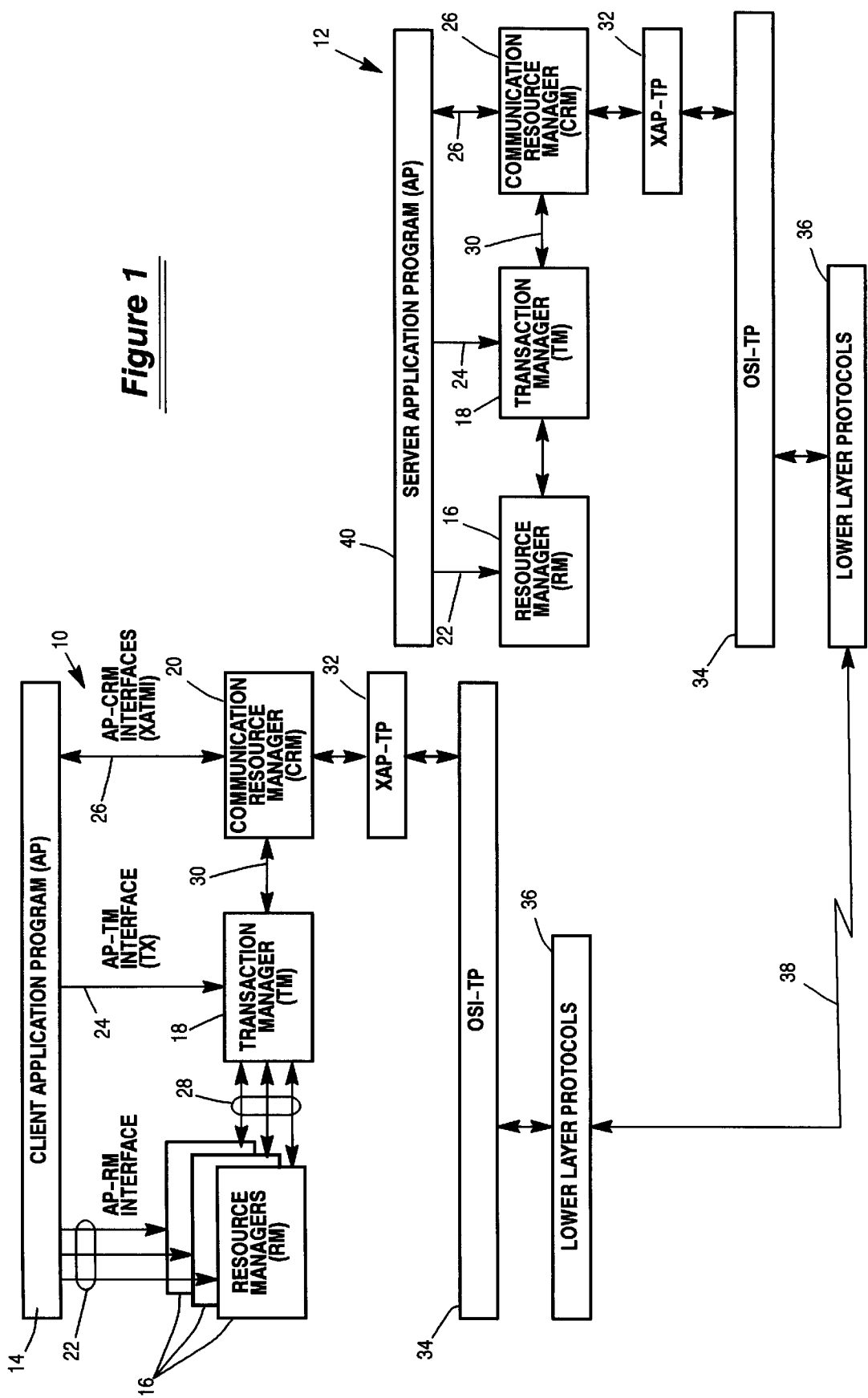
FIG. 1 is a block diagram illustrating the X/Open Distributed Transaction Processing (DTP) model architecture for distributed transaction processing systems.

As mentioned, each type of server program can also be multiply instantiated on one or more servers. In the embodiment shown in FIG. 2, for example, the request/response server program is multiply instantiated on each of five different servers, s1, s2 . . s5. Similarly, the conversational server program is multiply instantiated on each of five other servers, s1Conv, s2Conv . . . s5Conv. Although not shown, it is understood that the server programs instantiated on servers s1 . . . s5 and s1Conv . . . s5Conv communicate with the client program 50 via respective TM, CRM, and OSI TP components, in the same manner that the server application program 40 is illustrated in FIG. 1 communicating with the client application program 14 of the depicted system.

Each instance of the request/response server program provides an aCallService, a CallService, an abortService, and afailService. The request/response server program and the conversational server program are implemented in a manner similar to the examples provided in appendices A and B of Distributed Transaction Processing: The XATMI Specification, X/Open Company Limited, U.K., (1986–96), the contents of which are hereby incorporated by reference. The XATMI specification specifies a standard Service Information Structure, TPSVCINFO, to pass information between the client program and a server program.

aCallSernice and CallService of the request/response server program respond to XATMI function calls of the request/response type (e.g., tpacall and tpcall) by returning any incoming data back to the client program using the tpreturn function call. The pointer to the incoming data, provided in the incoming TPSVCINFO structure, is used as the data parameter in the tpreturn( ) function call.

failService responds to an XATMI function call of the request/response type by returning a message (e.g., TPESVCFAIL) indicating that the function call failed. Specifically, the failService routine sets the rval parameter in the tpreturn function call to TPESVCFAIL, and issues the call back to the client program.

abortService responds to an XATMI function call of the request/response type by terminating the server program. Specifically, the abortService makes a system-dependent call to the operating system of the server computer, requesting termination of the server program. For example, on UNIX systems, the abortService calls the exit( ) function.

Because the request/response server program can be instantiated on multiple servers, each service on each server is given a unique name that can be used to identify that particular service in an XATMI function call. In the present embodiment, the foregoing names are used along with an appended digit that reflects which server provides the service. For example, server s1 provides services aCallService1, CallService1, abortService1, and failService1, server s2 provides services aCallService2, CallService2, abortService2, and failService2, and so on.

Each instance of the conversational server program provides a convService. Using a naming convention similar to the request/response type services, the instances of convService on servers s1Conv, s2Conv, s3Conv, s4Conv, and s5Conv are named convService1, convService2, convService3, convService4, and convService5, respectively. The convService establishes a connection with the client program in response to a tpconnect function call and then subsequently responds to successive tpsend function calls until the client program relinquishes control of the connection, at which time the service returns a message (e.g., TPSVCSUCCESS) to the client program indicating successful termination of the connection. The convService responds to successive tpsend function calls by returning the data received from the client program in the tpsend function back to the client program using the tpreturn function. Specifically, the convService uses the pointer to the incoming data, provided in the incoming TPSVCINFO structure, as the data parameter in the tpreturn function call.

The server programs can also be compiled so that they write to a server log file (not shown). The level of logging that a server program performs can be set by changing a single value, e.g., serverLogLevel, at the beginning of the server program source code.

The client program 50 comprises a parser 52 and an interpreter 54 that together execute a script 58 containing a series of commands of a test language. According to the present invention, the test language comprises a plurality of test commands from which a test operator can write a test script to exercise the functionality of a component of the distributed transaction processing system under test. Certain ones of the test commands allow a test operator to execute XATMI function calls using a syntax that is much more simplified than the formal syntax of the XATMI API. More specifically, each of these test commands corresponds to a respective one of the function calls of the XATMI API, and each has a syntax and semantics that requires a lesser number of parameters to be supplied with the command than the formal syntax of the corresponding function call of the XATMI API. When the interpreter 54 executes one of these test commands, it determines whether any parameters (i.e., arguments) required by the formal syntax of the XATMI API have not been supplied with that test command, generates default values for any unsupplied parameters, constructs the corresponding function call of the XATMI API in accordance with its formal syntax using the generated default values, and then issues the constructed function call to the component(s) under test 56. The interpreter also allocates any buffers needed for return data. The present invention hides much of the complexities of the XATMI API from the test operator. The test operator can concentrate on developing test scripts that thoroughly exercise the functionality of a component under test, leaving the details of the formal syntax of the XATMI API to the interpreter of the present invention. Testing is therefore simplified and more efficient.

In the present embodiment, the component under test may, for example, be an implementation of a CRM or an implementation of the OSI TP communications protocol, or both. The interpreter 54 logs information about the XATMI function calls that it issues, as well as information about responses returned by the servers (e.g., s1 . . . s5, s1conv . . . s5conv). A test operator can examine the log file generated upon execution of a test script to identify possible discrepancies between returned and expected results.

Test operators can include the functions of the TX interface in a test script as well. These functions include tx_begin, tx_close, tx_commit, tx_info, tx_open, tx_rollback, tx_set_commit_return, tx_set_transaction_control, and tx_set_transaction_timeout. Calls to these functions are written in accordance with their formal syntax, which is much less complex than the formal syntax of the XATMI API.

The test language of the present invention also includes a number of administrative and control commands that can be used in a test script to control test execution. In the present embodiment, these commands include the following:

test test_id

This command begins a test and identifies the beginning of the test in the output log. Every test must begin with this command, even if there is only one test in the test script. This command must be the first command in any test script. test_id is the test identifier used to identify the test. It must begin with an alphabetic character, and thereafter may contain up to fourteen additional alphanumeric characters.

tell server TestCommand

This command sends the specified TestCommand to the specified server.

repeat repTimes

This command specifies the number of times, repTimes, a subsequent command will be repeated. It can be used to create transactions with many branches. Any number of repetitions may be specified between 1 and 32000. Invalid values are automatically replaced by a value of 1 (one).

setlog logLevel

This command sets the logging level for the client program 50. A value of zero turns logging off. The values below provided the following levels of logging:

logLevel=1

Log just the beginning and end of a test.

logLevel=2

Log the transaction boundaries, ie., a tx_begin, tx_commit, or tx—rollback issued by the client program.

logLevel=4

Log the test commands that cause the client program to issue XATMI functions calls, e.g., acall( ), alloc( ), call( ), connect( ), free( ), send( ), and recv( ). The log entries for each executed command include at least one log entry for the issued function call and the parameters with which the function call was issued. This entry is made before the function call is actually issued. After the function call is issued, at least one additional log entry is made to record the value or values returned to the client program.

logLevel=8

Echo whatever is logged to standard output.

logLevel=16

Log commands that perform internally defined functions that perform jobs such as translating error codes to text, loading buffers, etc.

Logging levels can be combined by adding their respective logLevel values. For example, if the test operator wishes to log both the test boundaries (logLevel=1) and the transaction boundaries (logLevel=2), then a value of logLevel=3 is used. A value of logLevel=31 performs all of the available logging functions. In the present embodiment, log entries are time-stamped.

Comments can be inserted in a test script using the "/*" and "*/" symbols to delimit the beginning and end of a comment, respectively. The symbol "****" comments out the rest of a current line.

The following is a description of each test command of the test language that corresponds to one of the function calls of the XATMI API. For each of these test commands, the syntax and semantics of the test language are specified. The formal syntax for the corresponding XATMI command is also provided for comparison. For some test commands, an example of how the command can be used in a test script is also provided. In the description of the syntax of each test command, items that are typed "as is" into a test script or a command line appear in normal text. Items for which a test operator supplies a value appear in italics. Items in the syntax that are optional, appear in square brackets. For example, [flagTokens] means that a test operator does not have to supply any value for flagTokens and that item may be omitted from the command when used in a test script. It is these optional items for which the interpreter 54 will supply default values in accordance with the present invention. Thus, a test operator can supply values if desired, but if the test operator chooses not to supply any values for one of these items, then the interpreter 54 will supply a default value when constructing the corresponding XATMI function call in accordance with its formal syntax. The interpreter 54 will also automatically allocate any required buffers for a given function call. The various commands are as follows:

tpacall

This function call of the XATMI API has the following formal syntax:

int tpacall(char *svc, char *data, long len, long flags)

The corresponding test command of the test language of the present invention has the following syntax:

cdvar=acall ( svcname[, data][,flagTokens])

cdVar is the name of a communications descriptor (cd) variable. There are five available cd variables: cd1, cd2, cd3, cd4, cd5. The cdVar returned in this command is used to identify the communication in later commands, typically getreply( ), or cancel( ).

svcname names a service available on any server involved in the test. In the present embodiment, the following services can be accessed by name using the acall( ) command: aCallService1, aCallService2, aCallService3, aCallService4, and aCallService5; failService1, failService2, failService3, failService4, and failService5; and abortService1, abortService2, abortService3, abortService4, and abortService5. These are the services on servers s1, s2, s3, s4, and s5, respectively.

data can be a quoted string containing up to 80 characters, or a previously allocated buffer variable (see, e.g., the alloc command described below). If a test operator omits this parameter, the interpreter 54 generates a default buffer and fills it by repeating the character string "aCallData."

flagTokens can comprise any one or more of the following tokens: NOTRAN, NOREPLY, NOBLOCK, NOTIME, and SIGRSTRT. Tokens are not separated by commas in the command. The values of the flagTokens are or-ed. If no flagTokens are supplied, the interpreter generates a default value of NOFLAGS only.

The following is an example of how this command can be used in a test script:

cd1=acall(aCallService1)
    getreply(cd1)

tpalloc

This function call of the XATMN API has the following formal syntax:

char * tpalloc(char *type, char *subtype, long size);

The corresponding test command of the test language of the present invention has the following syntax:

bufPtrVar=alloc(typevar, subtypevar[, size])

bufPtrVar names a pointer to the allocated buffer. There are five available buffer pointer variables. bp1, bp2, bp3, bp4, and bp5.

typevar is used to specify a type for the buffer. There are two valid types: X—COMMON and X_C_TYPE.

subtypevar is used to specify a subtype for the buffer. For X_COMMON, the subtypes include ch_comm and mx_comm. For X_C_TYPE, the subtypes include mx_c and mx_c_full.

size is an optional integer, with a different semantics than the size parameter listed in the formal syntax. This size is used to expand the allocated buffer for stress/volume testing. If the size is not supplied, the default definitions for the subtypes are used. If the size is supplied, then the largest pre-defined stress/volume buffer that is smaller than the specified size is used. The log will show which buffer was actually used. The names of the stress load buffers are the same as those for the subtypes above, but with the pre-defined size appended after an underscore. The pre-defined stress/volume buffers for X_COMMON are ch_comm_1000, ch_comm5000, ch_comm25000, ch_comm38000, ch_comm_42000, mx_comm_1000, mx_comm_5000, mx_comm25000, mx_comm_38000, and mx_comm_42000. The pre-defined stress/volume buffers for X_C_TYPE are mx_c_ 1000, mx_c5000, mx_c—25000, mx_c38000, mx_c42000, mx_c_full_1000, mx_c—full_5000, mx_c_full25000, mx_c_full_38000, and mx_c—full_42000.

The following is an example of how this command can be used in a test script:

test Vol-1

```
bp1 = alloc ( X_COMMON , ch_comm , 5000 )
/* this is the test */
repeat 100
cd1 = call ( CallService1, bp1 )
/* end of test Vol-1 */
repeat 1
free ( bp1 )
``` tpcall

This function call of the XATMI API has the following formal syntax:

int tpcall(char *svc, char *idata, long ilen, char **odata,
       long *olen, long flags)

The corresponding test command of the test language of the present invention has the following syntax:

call (svcname[, data][,flagTokens])

svcname names a service available on any server involved in the test. In the present embodiment, the following services can be accessed by name using the call( ) command: CallService1, CallService2, CallService3, CallService4, and CallService5; failService1, failService2, failService3, failService4, and failService5; and abortService1, abortService2, abortService3, abortService4, and abortService5. These are services on servers s1, s2, s3, s4, and s5, respectively.

data has the same meaning as in the acall command described above.

flagTokens can compnse any one or more of the following tokens: NOTRAN, NOCHANGE, NOBLOCK, NOTIME, and SIGRSTRT. Tokens are not separated by commas in the command. The values of the flagTokens are or-ed. If no flagTokens are supplied, the interpreter generates a default value of NOFLAGS only.

The sample test script shown in FIG. 3 shows an example of how this command can be used in a test script. Because the call( ) command is the synchronous version of the acall( ) command, call( ) does not return until a reply has been received from the server. Consequently, there is no need to use the getreply( ) command.

tpcancel

This finction call of the XATMI API has the following formal syntax:

int tpcancel(int cd);

The corresponding test command of the test language of the present invention has the following syntax:

cancel (cdVar)

cdVar names a communications descriptor (cd) variable. There are five available cd variables: cd1, cd2, cd3, cd4, cd5 (see the acall( ) command above for details). The cancel( ) command can be used with the acall( ) command, instead of getreply( ), to cancel a command for which a reply is expected.

The following is an example of how this command can be used in a test script:

test Cancel-1

```
/* this is the preamble */
cd1 = acall ( aCallService1, NOTRAN )
/* this is the test */
cancel ( cd1 )
/* log should show successful return from cancel */
/* end of test Cancel-1 */
``` tpconnect

This function call of the XATMI API has the following formal syntax:

int tpconnect(char *svc, char *data, long len, long flags);

The corresponding test command of the test language of the present invention has the following syntax:

cdVar=connect ( svcname[, data][,flagTokens])

cdVar is the name of a communications descriptor (cd) variable to hold the identity of the connection if it is successfully made. There are five available cd variables: cd1, cd2, cd3, cd4, and cd5. The cdVar returned in this command is used to identify the communication in later commands, such as send( ), recv( ), or discon( ).

svcname is the name of a service available for use with this command. As this command is of the conversational type, the available services include convService1, convService2, convService3, convService4, and convService5, which are on servers s1conv, s2conv, s3conv, s4conv, and s5conv, respectively.

data can be a quoted string containing up to eighty (80) characters, or a pointer to an allocated buffer. If data is not supplied with the command, the interpreter 54 inserts default data identified with the variable name "convConnectData."

flagTokens can comprise any one or more of the following tokens: NOTRAN, SENDONLY, RECVONLY, NOBLOCK, NOTIME, and SIGRSTRT. Tokens are not separated by commas in the command. The values of the flagTokens are or-ed. If no flagTokens are supplied, the interpreter 54 generates a default value of NOFLAGS only.

tpdiscon

This function call of the XATMI API has the following formal syntax:

int tpdiscon(int cd)

The corresponding test command of the test language of the present invention has the following syntax:

discon( cdVar)

cdVar is the communications descriptor (cd) variable that identifies the communication to be disconnected. Typically, this will be the value returned when the connect( ) command was executed.

The following is an example of how this command can be used in a test script:

test Discon-1

```
/* this is the preamble */
cd1 = connect ( convService1, NOTRAN )
/* log should show successful return from connect */
/* this is the test */
discon ( cd1 )
/* log should show successful return from discon */
/* server log should show a TP_U_ABORT */
/* end of test Discon-1 */
``` tpfree

This function call of the XATMI API has the following formal syntax:

void tpfree(char *ptr);

The corresponding test command of the test language of the present invention has the following syntax:

free ( bufPtrVar)

bufPtrVar names a pointer to the allocated buffer to be freed. The available buffer pointer variables are bp1, bp2, bp3, bp4, and bp5. The test operator will use the value returned by the alloc( ) command when the buffer to be freed was allocated.

tpgetrply

This function call of the XATMI API has the following formal syntax:

int tpgetrply(int *cd, char **data, long *len, long flags);

The corresponding test command of the test language of the present invention has the following syntax:

getreply ( cdVar[, flagTokens])

cdVar is the name of one of the available communications descriptor (cd) variables, cd1, cd2, cd3, cd4, and cd5. The communications descriptor returned by the acall( ) command is used here to identify the communication for which a reply is forthcoming.

flagTokens can comprise any one or more of the following tokens: GETANY, NOCHANGE, NOBLOCK, NOTIME, and SIGRSTRT. Tokens are not separated by commas in the command. The values of the flagTokens are or-ed. If no flagTokens are supplied, the interpreter 54 generates a default value of NOFLAGS only.

The following is an example of how this command can be used in a test script:

test GetReply-1

```
/* this is the test */
cd1 = acall ( aCallService1 )
getreply ( cd1 )
/* log should show successful return from getreply */
/* end of test GetReply-1 */
``` tprecv

This function call of the XATM API has the following formal syntax:

int tprecv(int cd, char **data, long *len, long flags, long *revent);

The corresponding test command of the test language of the present invention has the following syntax:

recv ( cdVar[,flagTokens])

cdVar names the communications descriptor variable (e.g., cd1, cd2, cd3, cd4, cd5) identifying the connection from which a reply is forthcoming.

flagTokens can comprise any one or more of the following tokens: NOCHANGE, NOBLOCK, NOTIME, and SIGRSTRT. Tokens are not separated by commas in the command. The values of the flagTokens are or-ed. If no flagTokens are supplied, the interpreter 54 generates a default value of NOFLAGS only.

The following is an example of how this command can be used in a test script:

```
*** begin test Recv-1
test Recv-1
*** this is the preamble
cd1 = connect ( convService1, RECVONLY )
*** this is the test
recv ( cd1 )
*** log should show successful return from receive
*** end of test Recv-1
``` tpsend

This finction call of the XATMI API has the following formal syntax:

int tpsend(int cd, char *data, long len, long flags, long *revent);

The corresponding test command of the test language of the present invention has the following syntax:

send (cdVar[, data][,flagTokens])

cdVar is the name of the communications descriptor (cd) variable (e.g., cd1, cd2, cd3, cd4, or cd5) that identifies the connection over which the data is to be sent—the communications descriptor is returned by the connect( ) command when the connection is established.

data can be either a quoted string of up to eighty (80) characters or a pointer to an allocated buffer. If data is not supplied with the command, the interpreter 54 uses default data identified by the variable name "convData."

flagTokens can comprise any one or more of the following tokens: RECVONLY, NOBLOCK, NOTIME, and SIGRSTRT. Tokens are not separated by commas in the command. The values of the flagTokens are or-ed. If no flagTokens are supplied, the interpreter 54 generates a default value of NOFLAGS only.

The following is an example of how this command can be used in a test script:

```
*** begin test Send-1
test Send-1
*** this is the preamble
cd1 = connect ( convService1, SENDONLY )
*** this is the test
send ( cd1 )
*** log should show successful return from send
*** this is the postamble
discon (cd1)
*** end of test Send-1
``` tptypes

This function call of the XATMI API has the following formal syntax:

long tptypes(char *ptr, char *type, char *subtype);

The corresponding test command of the test language of the present invention has the following syntax:

types ( bufPtrVar)

This command causes the type, subtype, and size of the buffer pointed to by bufPtrVar to be logged. The available buffer pointer variables are bp1, bp2, bp3, bp4, and bp5.

The following is an example of how this command can be used in a test script:

bp1=alloc ( X_COMMON , ch_comm)
types(bp1)

FIG. 3 shows a sample test script. Lines 70 are comments, as they begin with one of the acceptable comment designations, "****". Comments can also be offset by opening and closing symbols, "/*" and "*/", respectively. Line 72 identifies the beginning of a test within the test script, and provides a test identifier—"SAMPLEpreamble". All tests must being with the "test" keyword and a test identifier. Line 74 sets the logging level for this test script, in the manner described above. In accordance with the syntax of the alloc( ) command described above, lines 76 allocate three buffers, pointers to which are stored in the respective buffer pointer variables, bp1, bp2, and bp3. Note that the buffer indicated by buffer pointer variable bp1 has a different type (X_COMMON) than the other two allocated buffers (X_C_TYPE), and that the second and third buffers have different subtypes (mx_c versus mx—c—full). Lines 78 create a second test within the test script identified with the name "SAMPLEcommon". This test comprises a single test command, call( ), which performs a tpcall( ) function call directed to the service named "callService1" and specifies the pointer variable, "bp1", that points to the allocated buffer in which the named service is to store the result of the call. Lines 80 comprise another "test" defined within the test script to perform similar testing using the buffers pointed to by "bp2" and "bp3", respectively, which are of a different type than the allocated buffer identified by pointer "bp1."

FIGS. 4A and 4B show a sample log file generated upon execution of the test script of FIG. 3, with full logging selected (logLevel=31). It is understood that the designation "<date/time>" used throughout the example of FIGS. 4A and 4B would specify an actual date and time at which the event was logged. For example, a <date/time> entry in the log might read "Wed Oct 01 14:24:43 1998."

Lines 82 of the log form a header that identifies the name of the test script file, which in this case is "SAMPLE.txt" Test scripts are also sometimes referred to as "test bed files."Line 84 of the log indicates acknowledgment of the log level that has been set using the setlog command. As shown at lines 86, for each of the three alloc( ) commands executed in the test "SAMPLEpreamble", two log entries are made. The first entry for each alloc( ) command logs the call and its parameters, and the second logs and translates the values returned by the server when the underlying XATMI function call, tpalloc( ), is issued by the interpreter 54. Lines 88 provide times stamps for the end of test "SAMPLEpreamble" and the beginning of test "SAMPLEcommon," respectively.

Lines 90 comprise four log entries for the call( ) command that is executed in test "SAMPLEcommon." Similarly, the lines shown at 92 and 94 each comprise four entries for the respective call( ) commands executed in test "SAMPLEctype". These entries are of three different types, as indicated in parenthesis after the <date/time> stamps. Entries marked by (TML) are logged at a first level of command execution, and provide a detailed indication of what buffer is used. For example, the (TML) entry in lines 92 verifies that a non-zero address was assigned to the buffer pointer variable maintained by the client program 50, as well as what type and subtype the client program 50 has recorded for that buffer. Entries marked by (INT) are logged at a second level of execution, and provide an even more detailed indication of internal client program functioning. For example, the (INT) entry in lines 92 verifies that a buffer load function of the client program 50 has correctly determined the type and subtype of the buffer it was passed. Entries marked by (TP)

indicate information regarding the status of the XATMI function call, in this case tpcall( ), issued by the interpreter 54, including the result returned by the identified service, and parameters provided to and returned from the function call. Note, that with subtyped buffers, the size parameter is determined from the subtype that is specified. Log entries showing a size of zero (0) reflect a default provided by the interpreter 54. The XATMI specification states that for subtyped buffers, a size of zero (0) may be specified. Note also, that because the syntax of the test language of the present invention allows literal strings to be supplied as data with call( ), acall( ), connect( ), and send( ) commands, a test operator can construct scripts in which the data buffer used in these commands will contain useful information that will be reflected in the generated log file, such as, for example, the sequence number of the particular transaction in which the command is being executed, of the branch number of a particular call within a transaction. Thus, in the event of failure during a lengthy test, the test operator can look at the contents of the buffer, as reflected in the log file, to determine at what point in the execution of the script the failure occurred.

Finally, lines 96 of the log comprise a summary block that follows every successful run of a test script. This summary block provides information concerning the number of script lines processed, the number of tests contained in those lines, the number of calls that were issued, the number of calls that returned anything other than RETURNOK, the number of transactions begun (e.g., tx_begin), the number of transactions that were rolled back (e.g., tx_rollback), and the interval (hh:mm:ss) that elapsed between the time stamp at the beginning of the test script (e.g., the time stamp at lines 82 of the sample log of FIG. 3) and the time stamp at the beginning of the summary block. If transactions were issued (e.g., tr_begin/tx_commit) the number of transactions per second is calculated. The number of call( ) and/or acall( ) commands executed per second is also calculated.

Figure 5:
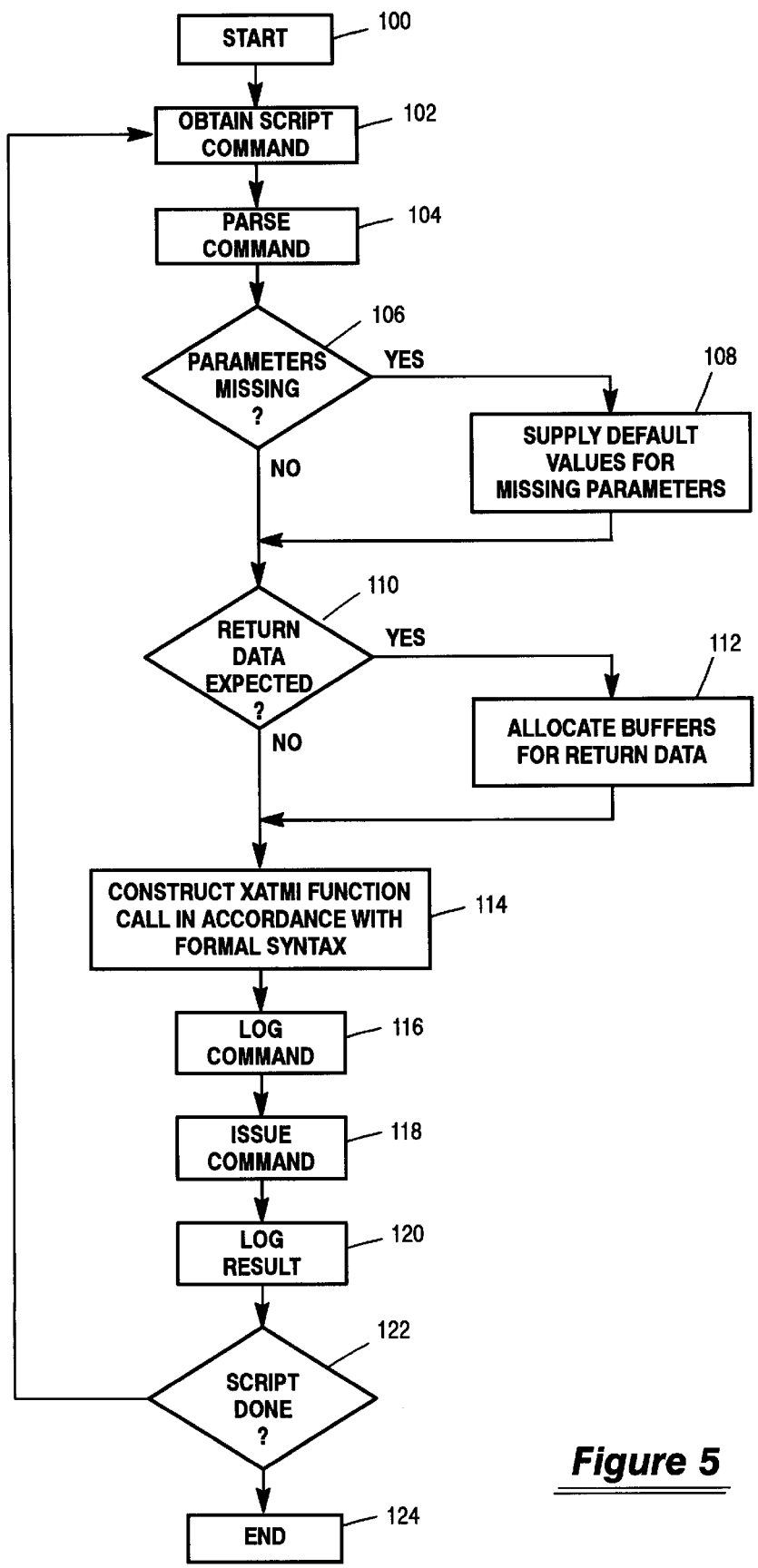
FIG. 5 is a flow diagram illustrating further details of the operation of the apparatus of FIG. 2, and also illustrating a preferred embodiment of a method of the present invention.

FIG. 5 is a flow diagram illustrating further details of the operation of the apparatus of FIG. 2, and also illustrating a preferred embodiment of a method of the present invention. In particular, the flow diagram of FIG. 5 illustrates the general manner in which the parser 52 and interpreter 54 function to execute the commands of the test language. Execution of a test script containing a series of test commands begins at step 100. At step 102, a line of the test script is input to the parser 52. The command is parsed at step 104 according to the syntax of the test language to determine which test command is to be executed, as well as any parameters (i.e., arguments) that have been supplied with the command. At step 106, the interpreter 54 determines whether any of the optional parameters (i.e., those enclosed in brackets "[ ]" above) have not been supplied by the test operator (which is permitted in accordance with the syntax of the test language). If some optional parameters have not been supplied, then the interpreter provides default values for those parameters at step 108, and control passes to step 110. If no parameters are missing, control passes directly from step 106 to step 110.

At step 110, the interpreter 54 determines whether any buffers need to be allocated for return data. If so, the buffers are allocated at step 112. If not, control passes directly to step 114. At step 114, the interpreter 54 constructs the XATMI function call that corresponds to the test command being executed. The XATMI finction call is constructed in accordance with its formal syntax, using any parameters supplied with the command, as well as any default values supplied by the interpreter 54 at step 108. Next, at step 116, the interpreter 54 makes an entry in a log file that provides information concerning the XATMI function call that has been constructed, such as, for example, the values of any supplied and/or generated default parameters. At step 118, the constructed function call is issued to the component under test, and any result received in response to the function call is logged at step 120. If the present command is the last one of the current test script, execution of the script ends at step 124. Otherwise, control passes from step 122 back to step 102 where the next command of the script is obtained for parsing. Processing of that command then proceeds in the same manner.

In the present embodiment, the parser 52 and interpreter 54, which perform the steps of the method illustrated in FIG. 5, are implemented using the well known programming language tools, LEX and YACC. LEX is a tool for generating a lexical analyzer. A lexical analyzer, sometimes also called a lexical scanner, receives an input string, such as, for example, a line of a test script, and breaks the string down into "tokens" that represent elements of the syntax of a language. From these tokens, the string can then be parsed in accordance with the syntax of the language. LEX generates a C program that performs the lexical analyzer function from a specification that is input to LEX. The LEX specification contains a definitions section, a rules section, and a user-written procedures section. The three sections are separated by a double percent sign, "%%". Appendix A, attached hereto, is an exemplary LEX specification for generating a lexical analyzer (part of the parser 52) to tokenize command statements of a test script written in the test language of the present invention.

YACC, which stands for "yet another compiler compiler", is traditionally used to generate compilers for computer languages. However, in accordance with the present invention, YACC is used to generate portions of both the parser 52 and interpreter 54. YACC takes as an input a grammar specification, and from that specification produces a C language program. A YACC specification includes a series of grammar productions for parsing a tokenized statement in accordance with the syntax of the language being implemented. In addition, YACC allows the developer to attach "semantic actions," in the form of C language routines, to the respective grammar productions of the YACC specification so that the generated code can perform additional tasks beyond mere syntax analysis. In accordance with the present invention, the syntax of each command of the test language is specified by a group of grammar productions, and the code for performing the interpretive steps (e.g., steps 108 through 118 of the method of FIG. 5) for each command is implemented as semantic actions to respective ones of the grammar productions.

Appendix B to this specification is a partial listing of a sample YACC specification for generating C language code that implements, in cooperation with the C language code generated from the LEX specification of appendix A, the functions of the parser 52 and interpreter 54 of FIG. 2, including the steps of the method illustrated in FIG. 5. Referring to appendix B, the YACC specification begins with a series of typical C language variable definitions, structure definitions, and #include directives (not shown). Lines 7 through 33 define the various tokens that the lexical analyzer will pass to the generated YACC code as it tokenizes each command statement of a test script in accordance with the lexical specification provided in appendix A. Lines 37 through 499 comprise a plurality of grammar productions and associated semantic actions that define the syntax and semantics of the test language of the present invention, and as mentioned above, that implement the functions of the parser 52 and interpreter 54 of the present invention.

Line 38, for example, provides a grammar production for the repeat repTimes command of the test language, and line 39 defines the semantic action for that command, which, in this case, involves assigning the value specified in the test script (stored by the lexical analyzer in variable "yylval") to an internal variable, "repTimes." Lines 41–49 comprise the grammar production and associated semantic action for the setlog logLevel command. Lines 50 through 64 provide grammar productions and associated semantic actions for any type and subtype parameters supplied with a test command. Lines 65–67 provide a grammar production and semantic action for any communications descriptor variable names that are supplied in a command statement. Recall from above, that five communication descriptor variable names are defined by the test language: cd1, cd2, cd3, cd4, and cd5. Lines 68–79 comprise the grammar productions and semantic actions for any data supplied as a parameter in a test command. In particular, line 68 is the grammar production for the case in which data is supplied in the form of a buffer pointer variable—bufPtrVar. Recall from above, that the acceptable buffer pointer variable names are bp1, bp2, bp3, bp4, and bp5. The grammar production for "bufPtrVar" appears at lines 102–105, which specifies, in combination with the "bp[1–5]" token rule in the LEX specification of appendix A, that a buffer pointer variable will comprise a BP token followed by an integer that is stored in an internal variable, bpIx. The integer is picked off the end of the token by the LEX specification statement, "yylval= atoi (yytext+2)," provided as part of the rule for "bp[1–5]" in the LEX specification (see, appendix A).

Grammar productions and semantic actions for the different service names that might be specified in a command statement are provided at lines 80–97. Grammar productions and semantic actions for other elements of the test language follow. For example, grammar productions and semantic actions for the different flags that might be supplied as parameters in a given command are listed at lines 113–206. This code effectively prevents a test operator from inadvertently supplying flags that violate the XATMI specification.

The beginning of a test in a test script is defined by the grammar production at lines 475–476, which indicates that a test begins with the token "TEST" followed by a test_identifier. In this case, the semantic action routine that follows at lines 477–488 performs certain functions that need to occur at the start of a test. For example, at line 478, a call is made to an iBuffs( ) routine. This routine (not shown) would be coded in the YACC specification starting at, for example, line 500. Essentially, this routine simply initializes a number of internal buffers that the parser 52 and interpreter 54 may employ during execution of a test. If a test statement in a script is not the first such statement, then lines 482–483 generate a log entry indicating the end of the previous test. The start of the specified test is then logged at lines 485–487. See, for example, log entries 88 in the sample log file shown in FIG. 4A.

The grammar production at line 490 specifies that a valid test will comprise the grammar element "test_begin" (defined in lines 475–476 as the token, "TEST," followed by a test identifier) followed by the grammar element "statements". Lines 217–219 indicate that the grammar element "statements" can comprise either a single statement or multiple statements. A "statement" is defined at lines 213–215 as either a "cafl—statement" or an "adm_statement."The element "call_statement" represents one of the test commands described above that performs a function call to the component under test. The element "adm_statement" represents one of the administrative and/or control statements of the test language, such as setlog or repeat.

Continuing to follow the grammar of the YACC specification, lines 221–223 define a "call_statement" as either a "txCall" or a "tpCall." A "txCall" represents one of the function calls of the TX API, which, as mentioned above, can be included in a text script using the formal syntax of the TX API. Grammar productions for each of these TX function calls are isted at lines 225–234. Semantic actions for each of these grammar productions are not shown.

A "tpCall" represents one of the commands of the test language that corresponds to a respective one of the function calls of the XATMI API, such as, for example, call( ), acall( ), connect( ), etc. Grammar productions that specify the syntax of each of these test commands are provided throughout lines 317–474 of the listing of appendix B, along with the semantic actions to be performed for each production.

To illustrate how the interpretive steps of the method of the present invention (FIG. 5) can be implemented using YACC, the listing of appendix B provides, as one example, at lines 319–424, the grammar productions that define the syntax of the call( ) command of the test language, along with exemplary C language code comprising the semantic action routines for these grammar productions. For the remaining commands of the test language, only the grammar productions have been provided (lines 425–474), as the coding of the semantic action routines for these commands would be similar to the example provided at lines 319–424.

As described above, the call( ) command of the test language corresponds to, and results in the issuance of, the XATMI function call, tpcall( ). In the listing of appendix B, lines 318, 327, 335, 358, 366, 385, and 405 each comprise a grammar production which together specify the syntax of the call( ) command of the test language described above. Essentially, each of these grammar productions reflects a different possible combination of parameters that may be provided with a call( ) command in a test script in accordance with the syntax of that command. For example, the grammar production at line 318 represents the syntax of a call( ) command where the test operator supplies only a service name (e.g., call(callService1)), leaving the other optional parameters, data and flags, to be supplied by the interpreter 54. The C language code that follows at lines 319–326 represents the semantic action for this variation of the call( ) command, which in the present embodiment supplies default values for the missing parameters in accordance with the method of the present invention. Similarly, the grammar production at line 335 represents a call( ) command in which the test operator has supplied both a service name and some form of data, but has not supplied any flags. The C language code that follows at lines 336–357, which represents the semantic action for this variation of the call( ) command, supplies a default flag value and determines what form of data has been supplied (as described above, the syntax of the call( ) command allows data to be specified either in the form of a pointer to a buffer containing data or in the form of a character string). The other grammar productions and their respective semantic action code handle the other possible variations of the call( ) command permitted by its syntax.

In operation, in accordance with the YACC specification, the parser 52 will step through the tokens of a call( ) command statement in a test script and match the arrangement of tokens with one of the grammar productions for the call( ) command (i.e., one of the grammar productions at lines 318, 327, 335, 358, 366, 385, or 405). Once the match is identified, the code comprising the semantic action to that grammar production (which defines a part of the functionality of the interpreter 54 of the present invention) is executed. That code will, in accordance with the present invention, supply default values for any parameters that were not supplied with the command. Generally, the grammar productions and associated semantic actions at lines 317–489 of the YACC specification implement steps 104–108 of the method illustrated in FIG. 5.

The remaining steps of the method are implemented by the code at lines 235–316 of the YACC specification. These lines provide grammar productions that further define what a "tpCall" element of the grammar of the test language can comprise. Each grammar production in this portion of the YACC specification corresponds to a different one of the test language commands. By defining "tpCall" as an abstract representation of the group of XATMI-based test commands, additional semantic action routines can be coded for each of the test language commands. For example, the grammar production at line 235 indicates that a "tpCall" can comprise the call( ) command of the test language, the grammar production at line 292 indicates that a "tpCall" can comprise the acall( ) command, the grammar production at line 294 indicates that a "tpCall" can comprise the alloc( ) command, and so on. Each of these grammar productions can have its own associated semantic action routines. Sample code for the call( ) command is provided at lines 236–291. Code defining semantic actions for the other commands has been omitted for convenience, but would be similar to the example provided for the call( ) command, except that it would be tailored to the functional requirements of the particular command, as specified in the XATMI specification.

Once the parser 52 determines from the grammar productions in lines 317–489 which variation of which command has been obtained from the test script and has executed the code defining the semantic action for the corresponding grammar production, the additional code for that command provided in the portion of the specification at lines 235 to 316 will be executed. For example, suppose that a statement in a test script reads "call(callService1, bp1)." The parser will tokenize that statement and then match it with the grammar production at line 335 of the YACC specification. Subsequently, the C language code comprising the semantic action for that grammar production (lines 336–357) will be executed. Specifically, at lines 337–344, the code will determine that the test operator supplied a buffer pointer for the data parameter, and will respond accordingly. At line 351, a default value of NOFLAGS will be generated for theflags parameter, since no flags were supplied with the command. Once this code is executed, control will switch to the additional call( ) command code provided as a semantic action to the grammar production at line 235. This code (lines 236–291) creates a log entry specifying the parameters that have been provided along with any that have been generated (lines 245–249), allocates a buffer for return data (lines 258–259), and constructs and issues the corresponding XATMI function call (tpcall( )) in accordance with its formal syntax (lines 262–263). Lines 265–279 perform logging of the result of the issued function call, and lines 283–290 re-initialize certain global variables that the code no longer needs.

Generally, the C language code at lines 236–291 implements steps 110 through 120 of the method illustrated in FIG. 5, for the call( ) command. Similar code would be provided as semantic actions to the grammar productions for each of the other commands specified in lines 292–316, each set of semantic actions being tailored to the functional requirements of its respective command.

As the foregoing illustrates, the present invention is directed to methods and apparatus for testing a component of a distributed transaction processing system implemented in accordance with the X/Open Distributed Transaction Processing model and supporting the XATMI application programming interface of the model (XATMI API). Using these methods and apparatus, the complexities of the formal syntax of the XATMI API are hidden from the test operator, enabling the test operator to concentrate on developing test scripts that thoroughly exercise the functionality of a component under test. It is understood that changes may be made to the embodiments described above without departing from the broad inventive concepts thereof Accordingly, the present invention is not limited to the particular embodiments disclosed, but is intended to cover all modifications that are within the spirit and scope of the invention as defined by the appended claims. It will also be appreciated that the methods and apparatus of the present invention may be employed to provided test languages, parsers and interpreters that simplify the use of other complex application programming interfaces in a test environment, and that the methods and apparatus of the present invention are by no means limited to use only in the context of the XATMI! API.

What is claimed is:

1. A tool for enabling a test operator to create a test script comprising commands of a simplified test language and to execute the commands of the test script to test a component of a distributed transaction processing system implemented in accordance with X/Open Distributed Transaction Processing model and supporting the XATMI application programming interface of said model (XATMI API), each command of the simplified test language corresponding to a respective one of the function calls of the XATMI API and at least some of the commands of the test language having a syntax and semantics that requires a lesser number of parameters to be supplied with the command than the formal syntax of the corresponding function call of the XATMI API, said tool comprising:

a parser for parsing the commands of the test script; and
an interpreter that (i) determines from a parsed command of the test script whether any parameters required by the formal syntax of the corresponding function call of the XATMI API have not been supplied, (ii) generates default values for any unsupplied parameters, (iii) constructs the corresponding function call of the XATMI API in accordance with its formal syntax using said generated default parameter values, and (iv) issues the constructed function call to the component under test.

2. The tool recited in claim 1, further comprising a means for recording information concerning a result of the issued function call to a log file.

3. The tool recited in claim 1, wherein the parser and interpreter are implemented as a YACC grammar, wherein the syntax of each test command is specified by a group of grammar productions, and wherein the steps (i) through (iv) performed by the interpreter are implemented as semantic actions to respective ones of the grammar productions.

4. The tool recited in claim 1, wherein the interpreter further operates to determine from a parsed command of the test script whether any buffers must be allocated in accordance with the formal syntax of the XATMI function call to which the parsed command corresponds, and if so, allocates any such necessary buffers.

5. The tool recited in claim 1, wherein the parser and interpreter together define a client program, and wherein the tool further comprises a server program executing on a server of the distributed transaction processing system, the server program providing at least one service that responds to an XATMI function call constructed and issued by the interpreter.

6. The tool recited in claim 5, wherein the server program provides at least one of:

a service that responds to an XATMI function call of the request/response type issued by the client program by returning any data transmitted with the function call back to the client program;

a service that responds to an XATMI function call of the request/response type issued by the client program by returning a message indicating that the function call failed;

a service that responds to an XATMI function call of the request/response type issued by the client program by terminating the server program; and a service that establishes a connection with the client program in response to a tpconnect function call and that subsequently responds to successive tpsend function calls until the client program relinquishes control of the connection, at which time the service returns a message to the client program indicating successful termination of the connection.

7. A tool for enabling a test operator to create a test script comprising commands of a simplified test language and to execute the commands of the test script to test a component of a distributed transaction processing system implemented in accordance with the X/Open Distributed Transaction Processing model and supporting the XATMI application programming interface of said model (XATMI API), each command of the simplified test language corresponding to a respective one of the function calls of the XATMI API and at least some of the commands of the test language having a syntax and semantics that requires a lesser number of parameters to be supplied with the command than the formal syntax of the corresponding function call of the XATMI API, said tool comprising a client program and a server program, the client program comprising:

a parser for parsing the commands of the test script; and an interpreter that (i) determines from a parsed command of the test script whether any parameters required by the formal syntax of the corresponding function call of the XATMI API have not been supplied, (ii) generates default values for any unsupplied parameters, (iii) constructs the corresponding function call of the XATMI API in accordance with its formal syntax using said generated default parameter values, and (iv) issues the constructed function call to the component under test;

the server program comprising at least one service that provides an expected response to an XATMI function call constructed and issued by the client program.

8. The tool recited in claim 7, further comprising a means for recording information concerning the execution of a test command.

9. The tool recited in claim 7, wherein the parser and interpreter of the client program are implemented as a YACC grammar, wherein the syntax of each test command is specified by a group of grammar productions, and wherein the steps (i) through (iv) performed by the interpreter are implemented as semantic actions to respective ones of the grammar productions.

10. The tool recited in claim 7, wherein the interpreter further operates to determine from a parsed command of the test script whether any buffers must be allocated in accordance with the formal syntax of the XATMI function call to which the parsed command corresponds, and if so, allocates any such buffers.

11. The tool recited in claim 10, wherein said at least one service comprises at least one of:

a service that responds to an XATMI function call of the request/response type issued by the client program by returning any data transmitted with the function call back to the client program;

a service that responds to an XATMI function call of the request/response type issued by the client program by returning a message indicating that the function call failed;

a service that responds to an XATMI function call of the request/response type issued by the client program by terminating the server program; and a service that establishes a connection with the client program in response to a tpconnect function call and that subsequently responds to successive tpsend function calls until the client program relinquishes control of the connection, at which time the service returns a message to the client program indicating successful termination of the connection.

12. A tool for enabling a test operator to create a test script comprising commands of a simplified test language and to execute the commands of the test script to test a component of a distributed transaction processing system implemented in accordance with the X/Open Distributed Transaction Processing model and supporting the XATMI application programming interface of said model (XATMI API), each command of the simplified test language corresponding to a respective one of the function calls of the XATMI API and at least some of the commands of the test language having a syntax and semantics that requires a lesser number of parameters to be supplied with the command than the formal syntax of the corresponding function call of the XATMI API, said tool comprising:

means for parsing the compound ofn the test script; and means for (i) determining from a parsed command of the test script whether any parameters required by the formal syntax of the corresponding function call of the XATMI API have not been supplied, (ii) generating default values for any unsupplied parameters, (iii) constructing the corresponding function call of the XATMI API in accordance with its formal syntax using said generated default parameter values, and (iv) issuing the constructed function call to the component under test.

13. The tool recited in claim 12, further comprising a means for recording information concerning a result of the issued function call to a log file.

14. The tool recited in claim 12, wherein the means for parser and means for determining, generating, constructing, and issuing are implemented as a YACC grammar, wherein the syntax of each test command is specified by a group of grammar productions, and wherein the functions (i) through (iv) are implemented as semantic actions to respective ones of the grammar productions.

15. The tool recited in claim 12, further comprising means for determining from a parsed command of the test script whether any buffers must be allocated in accordance with the formal syntax of the XATMI function call to which the parsed command corresponds, and if so, for allocating any such necessary buffers.

16. The tool recited in claim 12, further comprising means providing at least one service that responds to an XATMI function call constructed and issued by the interpreter.

17. The tool recited in claim 16, wherein said at least one service comprises at least one of:
   a service that responds to an XATMI function call of the request/response type by returning any data transmitted with the function call;
   a service that responds to an XATMI function call of the request/response type by sending a return message indicating that the function call failed;
   a service that responds to an XATMI function call of the request/response type by terminating said at least one service; and
   a service that establishes a connection in response to a tpconnect function call and that subsequently responds to successive tpsend function calls until control of the connection is relinquished, at which time the service sends a return message indicating successful termination of the connection.

18. A method for enabling a test operator to create a test script comprising commands of a simplified test language and to execute the commands of the test script to test a component of a distributed transaction processing sytem implemented in accordance with the X/Open Distributed Transaction Processing model and supporting the XATMI application programming interface of said model (XATMI API), each command of the simplified test language corresponding to a respective one of the function calls of the XATMI API and at least some of the commands of the test language having a syntax and semantics that requires a lesser number of parameters to be supplied with the command than the formal syntax of the corresponding function call of the XATMI API, said method comprising of the steps;
   parsing the commands of the test script;
   determining from a parsed command of the test script whether any parameters required by the formal syntax of the corresponding function call of the XATMI API have not been supplied;
   generating default values for any unsupplied parameters;
   constructing the corresponding function call of the XATMI API in accordance with its formal syntax using said generated default parameter values; and
   issuing the constructed function call to the component under test.

19. The method recited in claim 18, further comprising the step of recording information concerning a result of the issued function call to a log file.

20. The method recited in claim 18, further comprising the steps of determining from the parsed command whether any buffers must be allocated in accordance with the formal syntax of the XATMI function call to which the parsed command corresponds, and if so, allocating any such buffers.

21. The method recited in claim 18, wherein said steps of parsing, determining, generating, constructing, and issuing are performed by a client program, and wherein the method further comprises providing, by a server program executing on a server of the distributed transaction processing system, at least one service that responds to an XATMI function call issued in said issuing step.

22. The method recited in claim 21, wherein said at least one service comprises at least one of:
   a service that responds to an issued XATMI function call of the request/response type by returning any data transmitted with the function call back to the client program;
   a service that responds to an issued XATMI function call of the request/response type issued by returning a message indicating that the function call failed;
   a service that responds to an issued XATMI function call of the request/response type by terminating the server program; and
   a service that establishes a connection with the client program in response to a tpconnect function call and that subsequently responds to successive tpsend function calls until the client program relinquishes control of the connection, at which time the service returns a message indicating successful termination of the connection.

23. A method of testing a component of a distributed transaction processing system implemented in accordance with the X/Open Disturbed Transaction Processing model and supporting the XATMI API application programming interface of said model (XATMI API), said method comprising the steps of:
   providing a simplified test language comprising a plurality of commands from which a test operator can create a test script, each command of the test language corresponding to a respective one of the function calls of the XATMI API, at least ones of the commands of the test language having a syntax and semantics that requires a lesser number of parameters to be supplied with the command than the formal syntax of the corresponding function call of the XATMI API;
   parsing a command of a test script written in said test language and determining therefrom whether any parameters required by the formal syntax of the corresponding function call of the XATMI API have not been supplied with the command;
   generating default values for any unsupplied parameters;
   constructing the corresponding function call of the XATMI API in accordance with its formal syntax using said generated default parameter values; and
   issuing the constructed function call to the component under test.

24. The method recited in claim 23, further comprising the step of recording information concerning a result of the issued function call to a log file.

25. The method recited in claim 23, further comprising the steps of determining from the parsed command whether any buffers must be allocated in accordance with the formal syntax of the XATMI function call to which the parsed command corresponds, and if so, allocating any such buffers.

26. The method recited in claim 23, wherein said steps of parsing, determining, generating, constructing, and issuing are performed by a client program, and wherein the method further comprises providing, by a server program executing on a server of the distributed transaction processing system, at least one service that responds to an XATMI function call issued in said issuing step.

27. The method recited in claim 26, wherein said at least one service comprises at least one of:
   a service that responds to an issued XATMI function call of the request/response type by returning any data transmitted with the function call back to the client program;
   a service that responds to an issued XATMI function call of the request/response type issued by returning a message indicating that the function call failed;
   a service that responds to an issued XATMI function call of the request/response type by terminating the server program; and a service that establishes a connection with the client program in response to a tpconnect function call and that subsequently responds to successive tpsend function calls until the client program relinquishes control of the connection, at which time the service returns a message indicating successful termination of the connection.

28. A computer-readable medium having stored thereon program code that implements a test tool that enables a test operator to create a test script comprising commands of a simplified test language and to execute the commands of the test script to test a component of a distributed transaction processing system implemented in accordance with the X/Open Distributed Transaction Processing model and supporting the XATMI application programming interface (XATMI API) of said model, said test language comprising a plurality of commands, each command of the simplified test language corresponding to a respective one of the function calls of the XATMI API and at least ones of the commands of the test language having a syntax and semantics that requires a lesser number of parameters to be supplied with the command than the formal syntax of the corresponding function call of the XATMI API, the program code, when executed by a computer, causing the computer to perform the following steps:

(a) parse a command of test script written in the test language, (b) determine from the parsed command whether any parameters required by the formal syntax of the corresponding function call of the XATMI API have not been supplied;

(c) generate default values for any unsupplied parameters;

(d) construct the corresponding function call of the XATMI API in accordance with its formal syntax using said generated default values; and (e) issue the constructed function call to a component under test.

29. The computer program recited in claim 28, further comprising program code that, when executed by a computer, records information concerning a result of the issued function call to a log file.

30. The computer program recited in claim 28, wherein the program code of the computer program is generated from a YACC grammar specification in which the syntax of each command of the test language is specified as a group of grammar productions, and in which the program code for performing the functions of steps (b) through (e) for each command is implemented as semantic actions to respective ones of the grammar productions.

31. The computer program recited in claim 28, wherein the computer program further comprises program code that, when executed by a computer, further determines from the parsed command of the test language whether any buffers must be allocated in accordance with the formal syntax of the XATMI function call to which the parsed command corresponds, and if so, allocates any such buffers.

32. An interpreter of a simplified test language for testing a component of a distributed transaction processing system implemented in accordance with the X/Open Distributed Transaction Processing model and supporting the XATMI application programming interface of said model (XATMI API), said language comprising a plurality of commands, each command corresponding to a respective one of the function calls of the XATMI API, at least ones of the commands of the test language having a syntax and semantics that requires a lesser number of parameters to be supplied with the command than the formal syntax of the corresponding function call of the XATMI API, the interpreter comprising program code embodied on a computer readable medium.

* * * * *